United States Patent
Samuthirapandian et al.

(10) Patent No.: US 10,861,341 B2
(45) Date of Patent: Dec. 8, 2020

(54) METHOD AND SYSTEM FOR PROMPTING AIRCRAFT TASK REMINDERS

(71) Applicant: HONEYWELL INTERNATIONAL INC., Morris Plains, NJ (US)

(72) Inventors: Subash Samuthirapandian, TamilNadu (IN); Pramod Kumar Malviya, Karnataka (IN); Thea L. Feyereisen, Hudson, WI (US); Gang He, Morristown, NJ (US); Brock Graham, Gilbert, AZ (US); Bryan Charles Weaver, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 16/215,873

(22) Filed: Dec. 11, 2018

(65) Prior Publication Data
US 2020/0184830 A1  Jun. 11, 2020

(51) Int. Cl.
*B64D 45/00* (2006.01)
*G08G 5/00* (2006.01)
*G01S 5/00* (2006.01)
*G08B 21/24* (2006.01)

(52) U.S. Cl.
CPC ........... *G08G 5/0021* (2013.01); *B64D 45/00* (2013.01); *G01S 5/0027* (2013.01); *G08B 21/24* (2013.01); *G08G 5/0013* (2013.01)

(58) Field of Classification Search
CPC ............................... G01C 23/00; G08G 5/0021
USPC ........................................................ 340/963
See application file for complete search history.

(56) References Cited

U.S. PATENT DOCUMENTS

| | | | |
|---|---|---|---|
| 6,112,141 A * | 8/2000 | Briffe | G01C 23/00 345/1.3 |
| 6,922,703 B1 * | 7/2005 | Snyder | G01C 23/005 345/633 |
| 9,592,921 B2 | 3/2017 | Dominic et al. | |
| 9,593,961 B2 | 3/2017 | Ramaiah et al. | |
| 9,849,999 B1 * | 12/2017 | Fymat | B64D 43/00 |
| 2015/0308833 A1 | 10/2015 | Feyereisen et al. | |
| 2016/0019794 A1 | 1/2016 | Dominic et al. | |
| 2016/0161283 A1 | 6/2016 | Shamasundar et al. | |
| 2016/0275801 A1 * | 9/2016 | Kopardekar | G08G 5/0069 |
| 2018/0174470 A1 * | 6/2018 | Rysdyk | G05D 1/0011 |
| 2018/0218619 A1 * | 8/2018 | Brown | H04W 12/0602 |
| 2018/0366010 A1 * | 12/2018 | Agam | G08G 5/0034 |

FOREIGN PATENT DOCUMENTS

EP  3142093 A1  3/2017

* cited by examiner

*Primary Examiner* — Qutbuddin Ghulamali
(74) *Attorney, Agent, or Firm* — Lorenz & Kopf, LLP (57) ABSTRACT

Methods and systems are provided for prompting a pilot of an aircraft of reporting waypoint tasks. The method comprises retrieving compulsory reporting waypoints that are located along a stored planned flightpath for the aircraft. Pre-defined waypoint tasks are also retrieved for each compulsory reporting waypoint. The location of the aircraft is tracked along the planned flightpath and an alert for the pilot as the aircraft reaches each compulsory reporting waypoint. The alert prompts the pilot of the waypoint tasks by displaying the alert on a visual display device located on-board the aircraft.

17 Claims, 9 Drawing Sheets

METHOD AND SYSTEM FOR PROMPTING AIRCRAFT TASK REMINDERS

TECHNICAL FIELD

The present invention generally relates to aircraft flight operations, and more particularly relates to a method and system for prompting aircraft task reminders.

BACKGROUND

During flight operations, pilots sometimes forget to perform a required task at a designated geographic location. For example, a pilot may forget to: report to air traffic control (ATC) after reaching a specific location; request updated weather report; or switch a radio frequency/channel; etc. Such tasks are typically required upon reaching predesignated geographic locations called "waypoints". Hence, there is a need for a method and system for prompting aircraft task reminders.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A method is provided for prompting a pilot of an aircraft of reporting waypoint tasks. The method comprises: retrieving compulsory reporting waypoints from a stored flight plan for the aircraft, where the compulsory reporting waypoints are located along a planned flightpath for the aircraft; retrieving pre-defined waypoint tasks for each compulsory reporting waypoint; tracking a location for the aircraft along the planned flightpath; generating an alert for the pilot as the aircraft reaches each compulsory reporting waypoint, where the alert prompts the pilot of the pre-defined waypoint tasks for the compulsory reporting waypoint that has been reached by the aircraft; and displaying the alert to the pilot on a visual display device located on-board the aircraft.

A system is provided for prompting a pilot of an aircraft of reporting waypoint tasks. The system comprises: a flight management system (FMS) located on board the aircraft, where the FMS is configured to, retrieve compulsory reporting waypoints from a stored flight plan for the aircraft, where the compulsory reporting waypoints are located along a planned flightpath for the aircraft, retrieve pre-defined waypoint tasks for each compulsory reporting waypoint, track a location for the aircraft along the planned flightpath, generate an alert for the pilot as the aircraft reaches each compulsory reporting waypoint, where the alert prompts the pilot of the pre-defined waypoint tasks for the compulsory reporting waypoint that has been reached by the aircraft; and a visual display device located on-board the aircraft, where the visual display device displays the alert to an aircrew member of the aircraft.

Furthermore, other desirable features and characteristics of the method and system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

A method and system for prompting a pilot of an aircraft for task reminders has been developed. In some embodiments, compulsory reporting waypoints from a stored flight plan for an in-flight aircraft are retrieved from an onboard flight management system (FMS). Also, pre-defined waypoint tasks for each compulsory reporting waypoint are retrieved from the FMS. The location of the aircraft is tracked along the planned flight path and an alert for the pilot of the aircraft is generated as the aircraft reaches each compulsory reporting waypoint. The alert prompts the pilot of the predefined task reminder alert for compulsory reporting. The alert is displayed on a visual display device located on board the aircraft.

As used herein, charts may be any aviation chart or aeronautical chart provided as an informational aid to a flight crew for flight planning purposes. Chart data is any data provided by an electronic chart or a data driven chart (DDC). Aircraft generally use electronic charts for providing a flight crew member with information specific to a particular route and/or airport. Electronic charts may include airport maps; intersections and taxiways data; procedures and data associated with approach, arrival, and departure; and any flight constraints associated with a current flight plan. A flight plan is a proposed strategy for an intended flight, includes details associated with the intended flight, and is usually filed with an aviation authority (e.g., Federal Aviation Administration). An intended flight may also be referred to as a "trip" and extends from a departure airport at the beginning point of the trip to a destination airport at the endpoint of the trip. An alert may be any signal or warning indicating potential non-compliance with constraints associated with the current flight plan. The alert may be implemented as a display of text and/or graphical elements, a sound, a light, or other visual or auditory warning signal onboard the aircraft.

Figure 1:
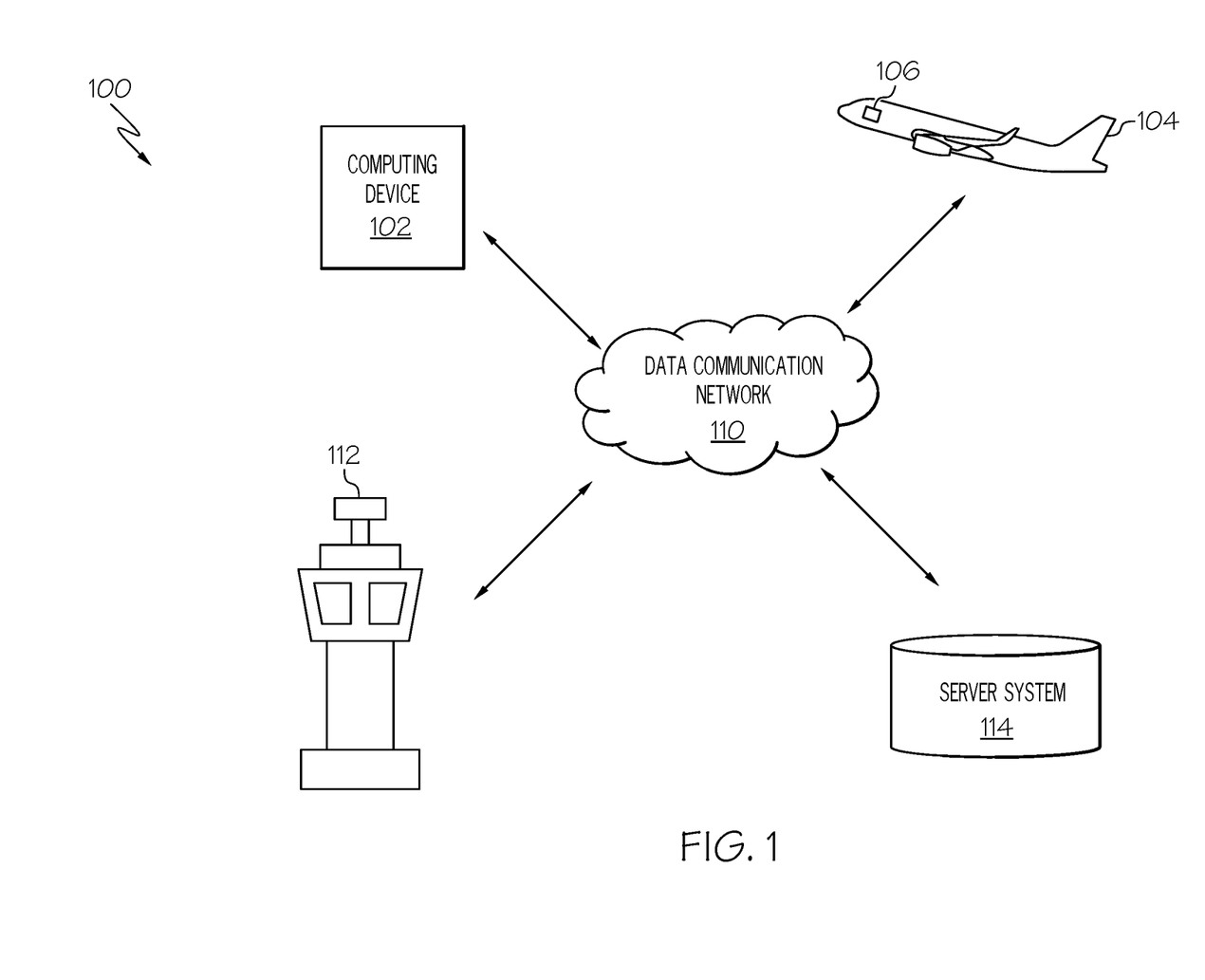
FIG. 1 shows a diagram of a system for providing waypoint task reminders for an aircraft in accordance with one embodiment.

Turning now to the figures, FIG. 1 is a diagram of a system 100 for providing waypoint task reminders for an aircraft, in accordance with the disclosed embodiments. The system 100 operates with a current flight of the aircraft 104, to continuously monitor flight data and parameters during flight. The system 100 may include, without limitation, a computing device 102 that communicates with one or more avionics systems 106 onboard the aircraft 104, at least one server system 114, and air traffic control (ATC) 112, via a data communication network 110. In practice, certain embodiments of the system 100 may include additional or alternative elements and components, as desired for the particular application.

The computing device 102 may be implemented by any computing device that includes at least one processor, some form of memory hardware, a user interface, and communication hardware. For example, the computing device 102 may be implemented using a personal computing device, such as a tablet computer, a laptop computer, a personal digital assistant (PDA), a smartphone, or the like. In this scenario, the computing device 102 is capable of storing, maintaining, and executing an Electronic Flight Bag (EFB) application configured to determine and present emergency alerts when flight constraints may not be satisfied by the current flight of the aircraft 104. In other embodiments, the computing device 102 may be implemented using a computer system onboard the aircraft 104, which is configured to determine and present such emergency alerts.

The aircraft 104 may be any aviation vehicle for which flight constraints and alerts associated with non-compliance with flight constraints are relevant and applicable during completion of a flight route. The aircraft 104 may be implemented as an airplane, helicopter, spacecraft, hovercraft, or the like. The one or more avionics systems 106 may include a Flight Management System (FMS), crew alerting system (CAS) devices, automatic terminal information system (ATIS) devices, Automatic Dependent Surveillance-Broadcast (ADS-B), Controller Pilot Data Link Communication (CPDLC), navigation devices, weather radar, aircraft traffic data, and the like. Data obtained from the one or more avionics systems 106 may include, without limitation: an approved flight plan, an estimated time of arrival, instructions from air traffic control (ATC), Automatic Terminal Information Service (ATIS) data, flight plan restriction data, onboard equipment failure data, aircraft traffic data, weather data, or the like.

The server system 114 may include any number of application servers, and each server may be implemented using any suitable computer. In some embodiments, the server system 114 includes one or more dedicated computers. In some embodiments, the server system 114 includes one or more computers carrying out other functionality in addition to server operations. The server system 114 may store and provide any type of data used to determine compliance and/or non-compliance with constraints associated with the current flight. Such data may include, without limitation: flight plan data, flight plan constraint data, and other data compatible with the computing device 102.

The computing device 102 is usually located onboard the aircraft 104, and the computing device 102 communicates with the server system 114 and air traffic control 112 via a wireless communication connection. The computing device 102 and the server system 114 are generally disparately located, and the computing device 102 and air traffic control 112 are generally disparately located. The computing device 102 communicates with the server system 114 and air traffic control 112 via the data communication network 110 and/or via communication mechanisms onboard the aircraft 104.

The data communication network 110 may be any digital or other communications network capable of transmitting messages or data between devices, systems, or components. In certain embodiments, the data communication network 110 includes a packet switched network that facilitates packet-based data communication, addressing, and data routing. The packet switched network could be, for example, a wide area network, the Internet, or the like. In various embodiments, the data communication network 110 includes any number of public or private data connections, links or network connections supporting any number of communications protocols. The data communication network 110 may include the Internet, for example, or any other network based upon TCP/IP or other conventional protocols. In various embodiments, the data communication network 110 could also incorporate a wireless and/or wired telephone network, such as a cellular communications network for communicating with mobile phones, personal digital assistants, and/or the like. The data communication network 110 may also incorporate any sort of wireless or wired local and/or personal area networks, such as one or more IEEE 802.3, IEEE 802.16, and/or IEEE 802.11 networks, and/or networks that implement a short range (e.g., Bluetooth) protocol. For the sake of brevity, conventional techniques related to data transmission, signaling, network control, and other functional aspects of the systems (and the individual operating components of the systems) may not be described in detail herein.

Figure 2:
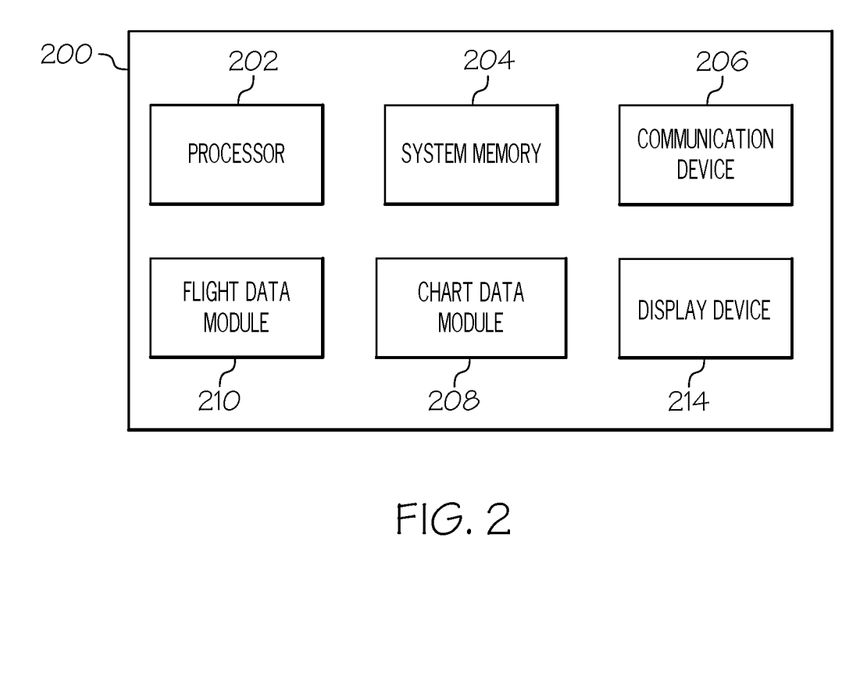
FIG. 2 is a functional block diagram of a computing device for providing waypoint task reminders for an aircraft in accordance with one embodiment.

FIG. 2 is a functional block diagram of a computing device 200, in accordance with the disclosed embodiments. It should be noted that the computing device 200 can be implemented with the computing device 102 depicted in FIG. 1. In this regard, the computing device 200 shows certain elements and components of the computing device 102 in more detail.

The computing device 200 generally includes, without limitation: at least one processor 202; system memory 204; a communication device 206; a chart data module 208; a flight data module 210; and a display device 214. These elements and features of the computing device 200 may be operatively associated with one another, coupled to one another, or otherwise configured to cooperate with one another as needed to support the desired functionality as described herein. For ease of illustration and clarity, the various physical, electrical, and logical couplings and interconnections for these elements and features are not depicted in FIG. 2. Moreover, it should be appreciated that embodiments of the computing device 200 will include other elements, modules, and features that cooperate to support the desired functionality. For simplicity, FIG. 2 only depicts certain elements that relate to the emergency alert-generating techniques described in more detail below.

The at least one processor 202 may be implemented or performed with one or more general purpose processors, a content addressable memory, a digital signal processor, an application specific integrated circuit, a field programmable gate array, any suitable programmable logic device, discrete gate or transistor logic, discrete hardware components, or any combination designed to perform the functions described here. In particular, the at least one processor 202 may be realized as one or more microprocessors, controllers, microcontrollers, or state machines. Moreover, the at least one processor 202 may be implemented as a combination of computing devices, e.g., a combination of digital signal processors and microprocessors, a plurality of microprocessors, one or more microprocessors in conjunction with a digital signal processor core, or any other such configuration.

The at least one processor 202 is communicatively coupled to the system memory 204. The system memory 204 is configured to store any obtained or generated data associated with emergency alerts related to potential non-compliance with flight constraints, including chart data, flight parameters associated with a current flight plan and operation of the aircraft during flight, and the like. The system memory 204 may be realized using any number of devices, components, or modules, as appropriate to the embodiment. Moreover, the computing device 200 could include system memory 204 integrated therein and/or a system memory 204 operatively coupled thereto, as appropriate to the particular embodiment. In practice, the system memory 204 could be realized as RAM memory, flash memory, EPROM memory, EEPROM memory, registers, a hard disk, a removable disk, or any other form of storage medium known in the art. In certain embodiments, the system memory 204 includes a hard disk, which may also be used to support functions of the computing device 200. The system memory 204 can be coupled to the at least one processor 202 such that the at least one processor 202 can read information from, and write information to, the system memory 204. In the alternative, the system memory 204 may be integral to the at least one processor 202. As an example, the at least one processor 202 and the system memory 204 may reside in a suitably designed application-specific integrated circuit (ASIC).

The communication device 206 is suitably configured to communicate data between the computing device 200 and one or more remote servers, one or more avionics systems onboard an aircraft, and air traffic control and/or ground control. The communication device 206 may transmit and receive communications over a wireless local area network (WLAN), the Internet, a satellite uplink/downlink, a cellular network, a broadband network, a wide area network, a radio communication network, or the like. As described in more detail below, data received by the communication device 206 may include, without limitation: an approved flight plan, an estimated time of arrival, Automatic Terminal Information Service (ATIS) data, flight plan restriction data, onboard equipment failure data, and other data compatible with the computing device 200. Data provided by the communication device 206 may include, without limitation, radio communications and/or downlink communications transmitted to air traffic control (ATC), and the like.

The chart data module 208 is configured to identify and extract constraints noted in the electronic charts for a current flight plan. A flight constraint is a restriction for performing action items applicable to the current flight, effectively limiting the performance of one or more action items to circumstances in which a particular condition exists. Examples of constraints may include, but are not limited to, restricting the performance of landing procedures (i.e., action items) to daytime hours (i.e., a condition) and/or to circumstances during which local weather data is available (i.e., a condition) or a destination airport tower is operational (i.e., a condition).

The flight data module 210 is configured to obtain flight data parameters from one or more avionics devices onboard the aircraft and/or from one or more remote servers or other external sources (via the communication device 206). Flight data parameters may include, without limitation: an approved flight plan, an estimated time of arrival, Automatic Terminal Information Service (ATIS) data, flight plan restriction data, onboard equipment failure data, or the like.

In practice, the chart data module 208 and the flight data module 210 may be implemented with (or cooperate with) the at least one processor 202 to perform at least some of the functions and operations described in more detail herein. In this regard, the chart data module 208 and the flight data module 210 may be realized as suitably written processing logic, application program code, or the like.

The display device 214 is configured to display various icons, text, and/or graphical elements for emergency alerts associated with potential non-compliance with flight constraints, or the like. In an exemplary embodiment, the display device 214 is communicatively coupled to the at least one processor 202. The at least one processor 202 and the display device 214 are cooperatively configured to display, render, or otherwise convey one or more graphical representations or images associated with emergency alerts on the display device 214, as described in greater detail below. In an exemplary embodiment, the display device 214 is realized as an electronic display configured to graphically display emergency alerts, as described herein. In some embodiments, the computing device 200 is an integrated computer system onboard an aircraft, and the display device 214 is located within a cockpit of the aircraft and is thus implemented as an aircraft display. In other embodiments, the display device 214 is implemented as a display screen of a standalone, personal computing device (e.g., laptop computer, tablet computer). It will be appreciated that although the display device 214 may be implemented using a single display, certain embodiments may use additional displays (i.e., a plurality of displays) to accomplish the functionality of the display device 214 described herein.

Some embodiments use task reminder alerts that are displayed on a "moving map display". A moving map display is a type of navigation system that displays the user's current location at a center of a map, instead of numerically displaying the current geographical coordinates determined by a navigation sensor or a heading and distance indication from a certain waypoint. As the user moves and new coordinates are determined, the map moves to keep the position of the unit at the center of the display. A common example of a moving map display is a global positioning system (GPS) system that determines the user's current position and then recalls map data from the system's memory for use in the display.

A symbol representing the location of the user is centered on the display and remains stationary while the map or chart images move beneath the symbol. The display portrays the physical movement of the user on the map or chart. The portrayal typically shows a simulated overhead view of the device's location on the moving map. In alternative embodiments, other devices may also simulate a 3-dimensional view from the perspective of the device. In other embodiments, the moving map display may provide an option for the map or chart image to remain stationary on the display as the user's location symbol moves to represent physical device movement. Some moving map display systems also provide a method of displaying the altitude or elevation of the user above sea level or the Earth's surface. In alternative embodiments, the task reminder alerts may be displayed on a vertical situation display (VSD) or a synthetic vision system (SVS) or other similar device. In all of these embodiments, the task reminder alert should pop up automatically when the aircraft reaches the task reminder's location.

In some embodiments, task reminder alerts are defined automatically based on system inputs that are filed as part of a flight plan. These alerts are based on system and regulatory requirements. For example, a required task reminder may be reporting to ATC at compulsory reporting waypoints. Compulsory reporting waypoints may be designated on display maps by special symbols (e.g., solid triangles) or filed in a flight plan as specific points selected to define specific routes. These points are geographic locations which are defined by navigational aids/fixes. A FMS will provide details about the flight plan waypoints that require compulsory reporting to ATC. In other embodiments, the task reminder alerts are defined manually based on input by an aircrew member. Examples of these tasks reminders include: landing gear retraction; changing communication frequencies/channels; receiving an updated weather report; adjusting transponder settings; adjusting altimeter settings; etc.

Figure 3:
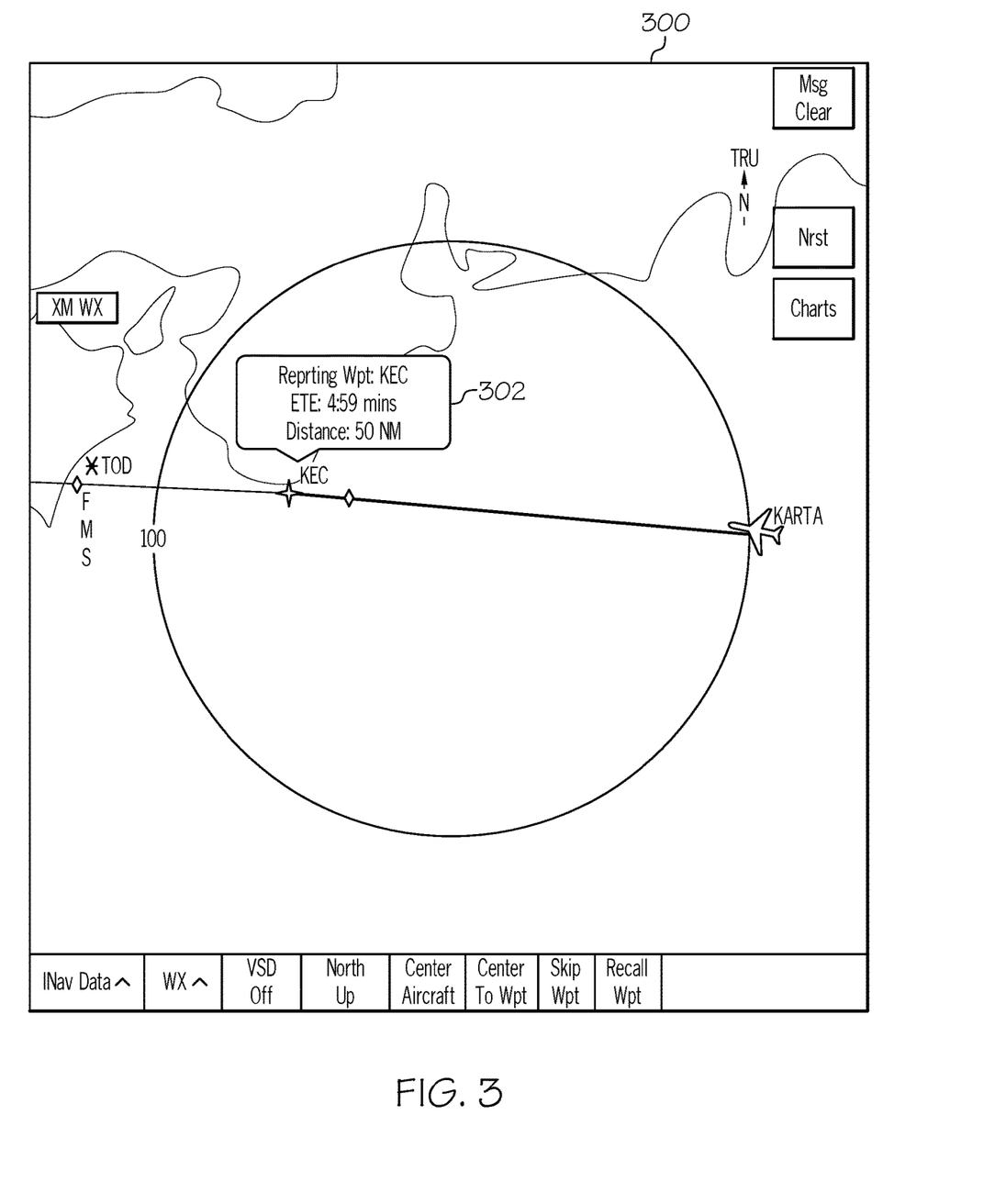
FIG. 3 shows a display of a reporting waypoint with a pop-up reminder in accordance with one embodiment.
Figure 4:
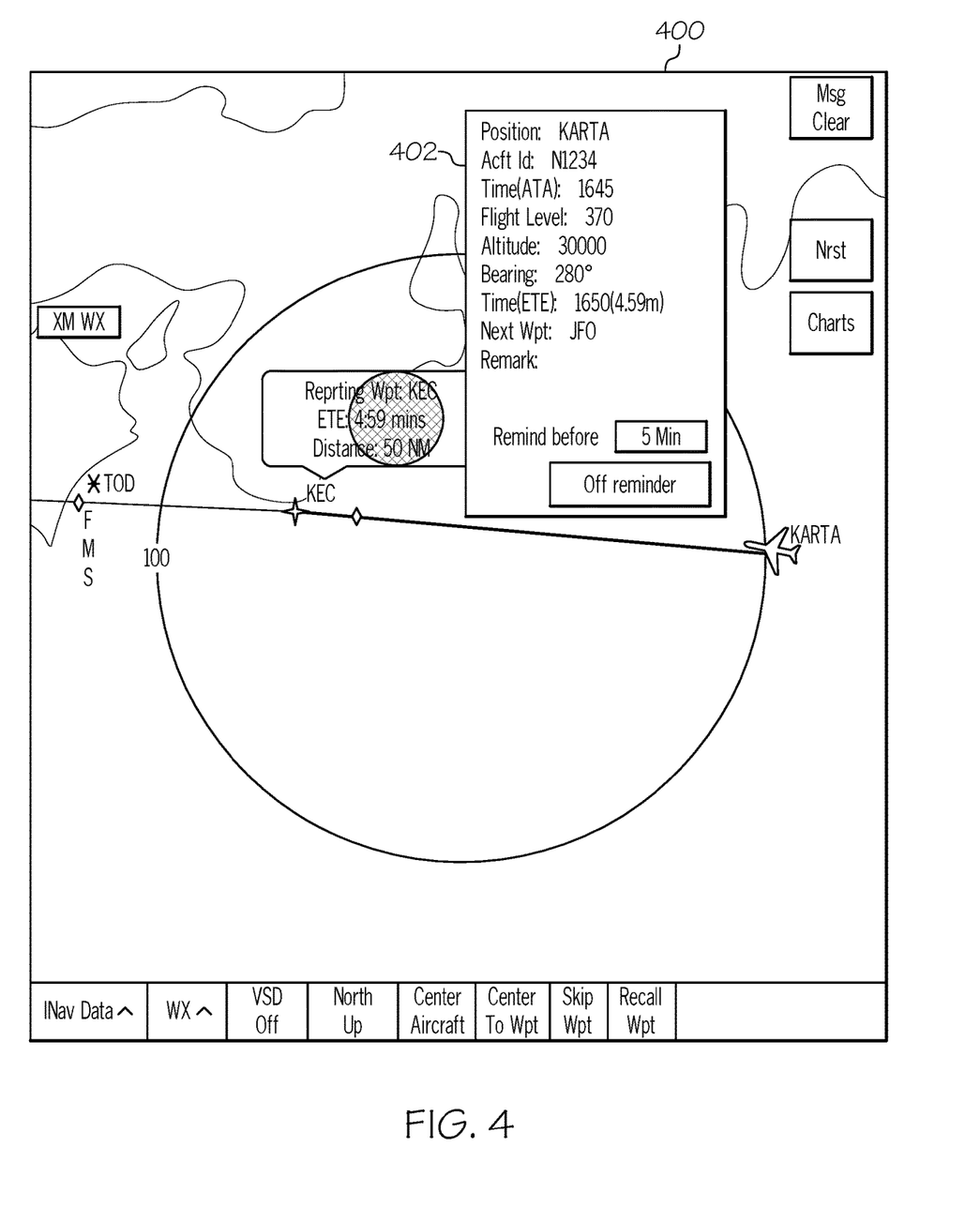
FIG. 4 shows a display of a hovering cursor pop up reminder for reporting waypoint in accordance with one embodiment.

Turning now to FIG. 3, a display 300 is shown with a pop-up reminder 302 for a reporting waypoint labeled "KEC" along the flight path of the aircraft. Turning now to FIG. 4, a display 400 is shown of a hovering cursor pop-up 402 for the KEC reporting waypoint. The hovering cursor pop-up 402 shows additional display information including: the position of the aircraft; the aircraft ID; the present time; the flight level; the altitude; aircraft bearing; and the next waypoint. The pop-up also allows the aircrew members to turn off the reminder or to designate generation of the reminder at a specified time period before reaching the waypoint.

Figure 5:
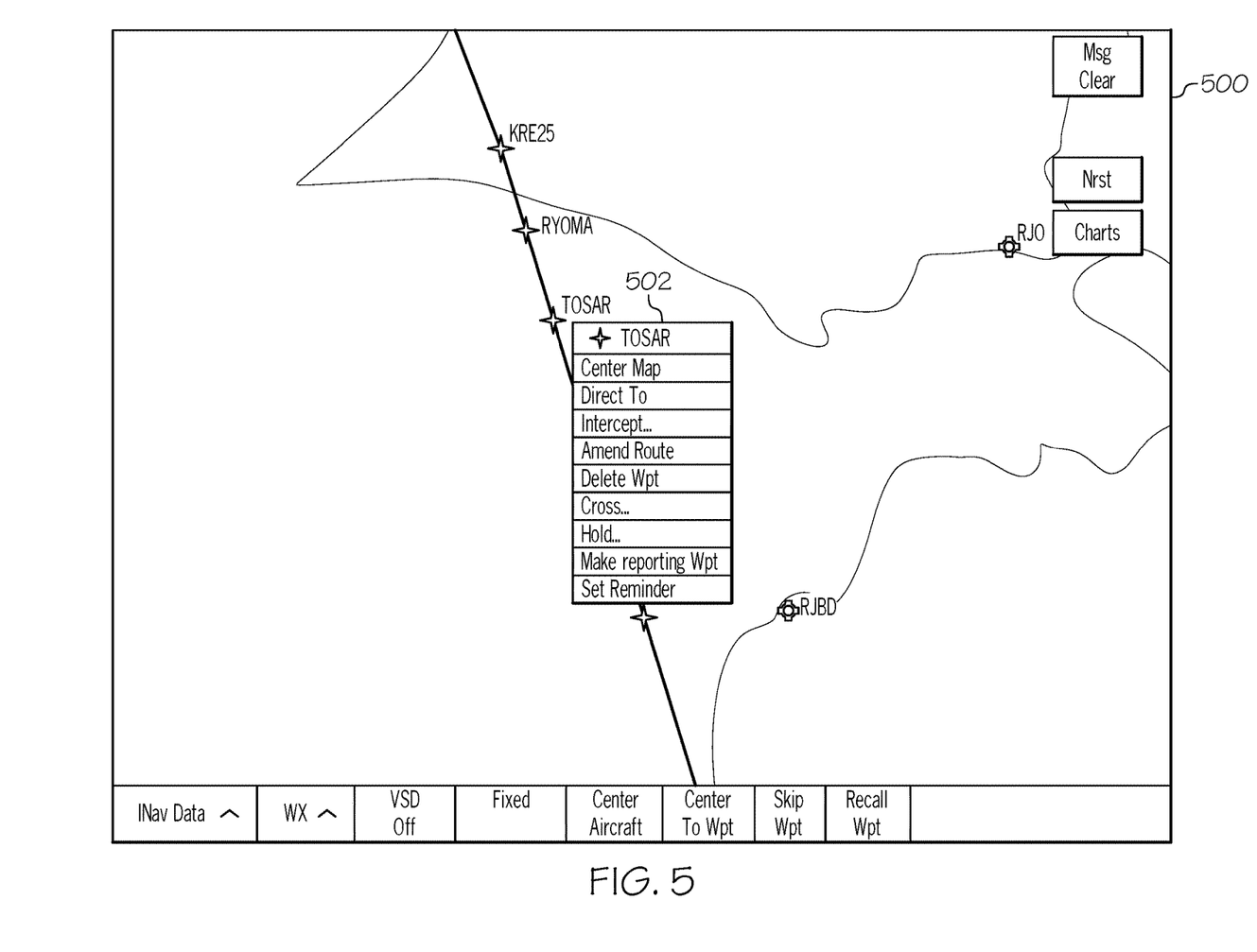
FIG. 5 shows a display of a task menu for designating a reporting waypoint and adding a task reminder in accordance with one embodiment.
Figure 6:
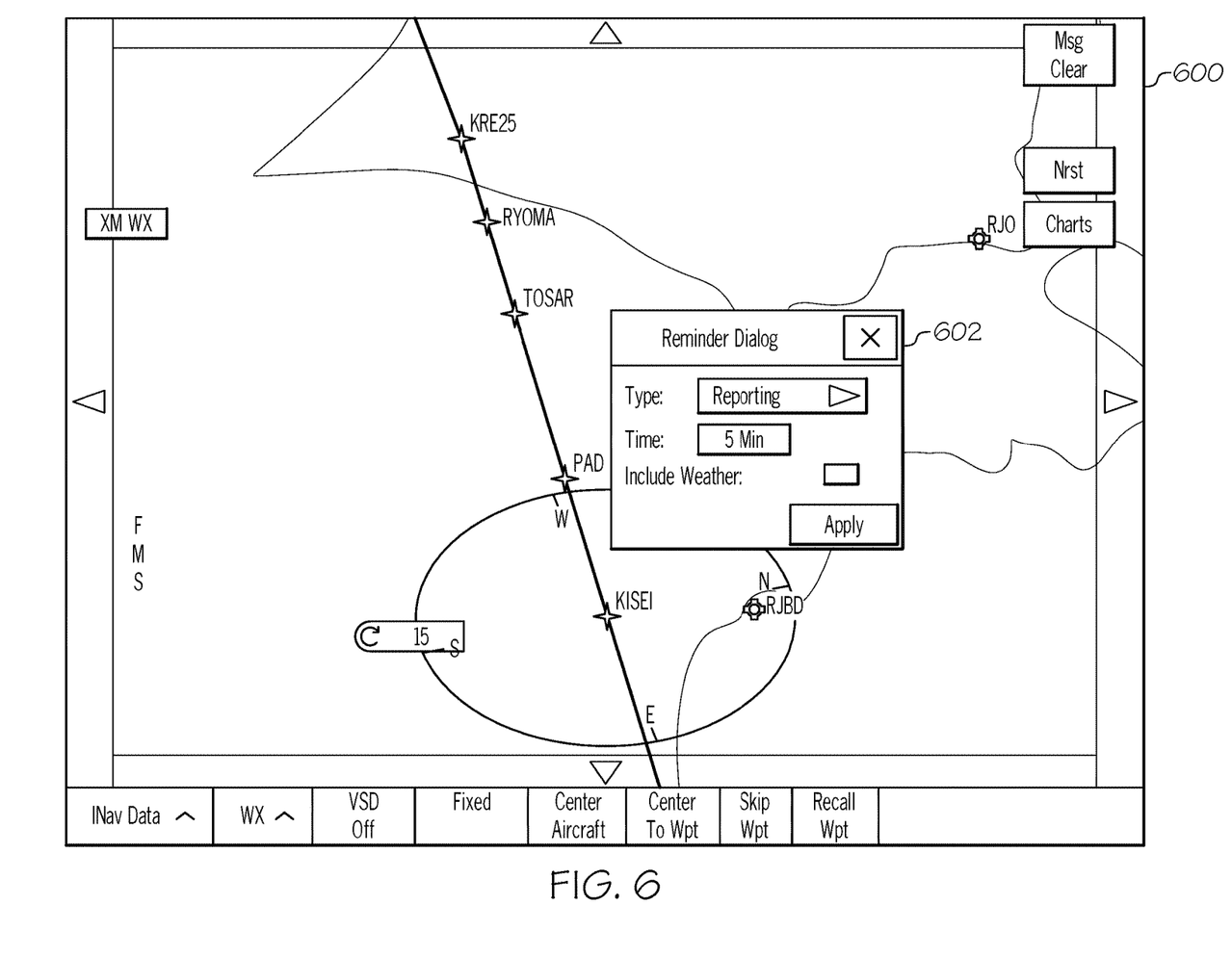
FIG. 6 shows a display of a dialog box for adding a task reminder in accordance with one embodiment.
Figure 7:
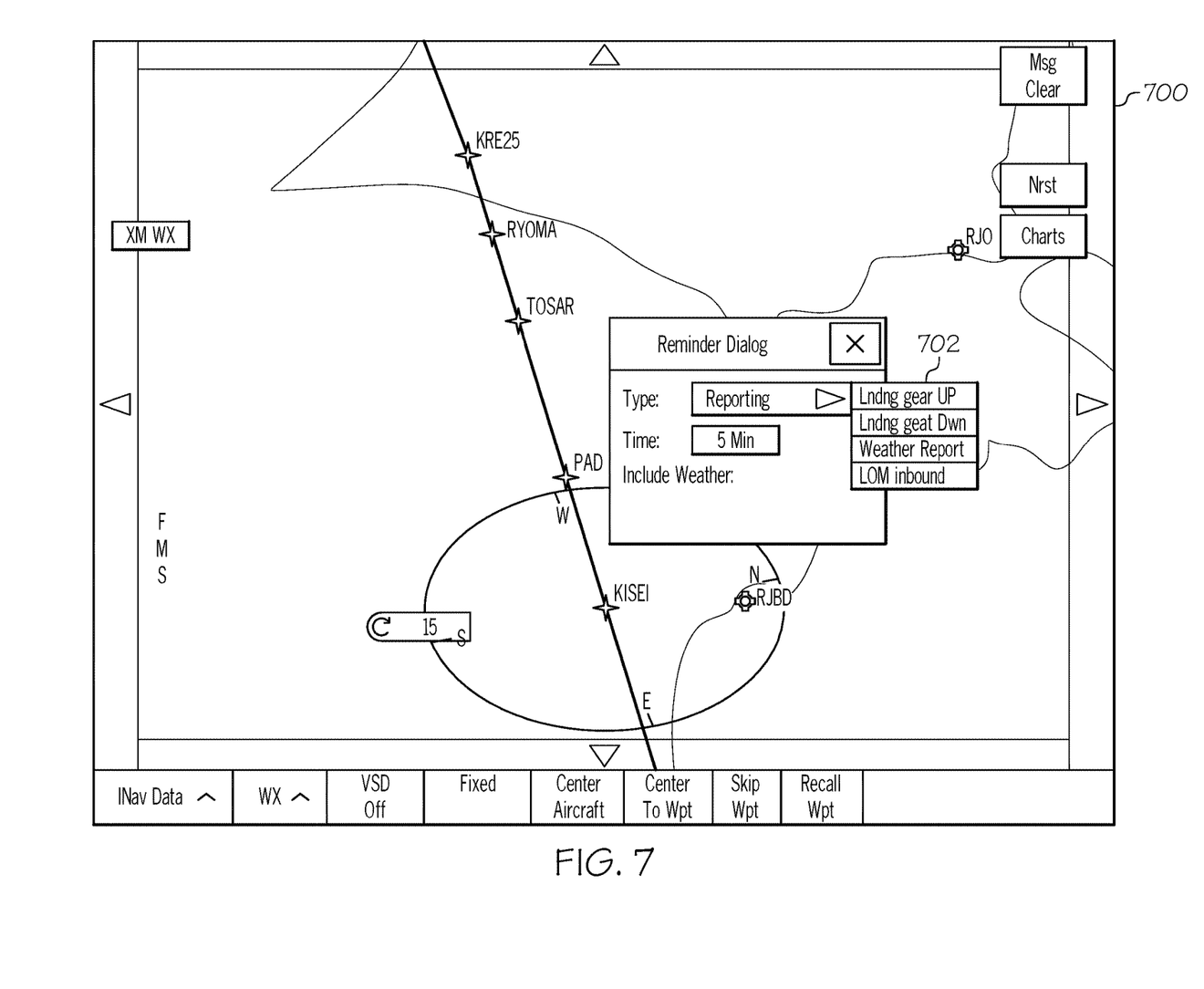
FIG. 7 shows a display of a pulldown menu for a task reminder dialog box in accordance with one embodiment.

Turning now to FIG. 5, a display 500 is shown with a task menu 502 for manually designating a reporting waypoint and adding a reminder for the waypoint to the system. In this display, the reminder is manually added for the reporting waypoint designated "TOSAR". Turning now to FIG. 6, a display 600 is shown of a task reminder dialog box 602 for setting up a reporting waypoint. The dialog box allows the user to designate the type of waypoint (e.g., Reporting) as well as setting a time to generate the alert prior to arrival at the waypoint. Turning now to FIG. 7, a display 700 is shown of a pulldown menu 702 for the dialog box 602 for adding a reporting waypoint. The pulldown menu allows the user to designate the substance of the alert upon reaching the reporting waypoint. In this embodiment, the user has the option of designating a reminder for: landing gear up; landing gear down; weather report; or LOM (Compass Locator at Outer Marker) inbound. It should be understood that in some embodiments, any pre-determined point along the flight path of the aircraft may be designated for a reminder and not just a mandatory reporting waypoint along the flight plan. For example, a pilot for an aircraft without flight plan may want to change to a new communication frequency or navigation frequency at a particular geographical location. A task reminder function is able to allow pilot to define/set a reminder and pop up a reminder when the designated navigation point is reached.

Figure 8:
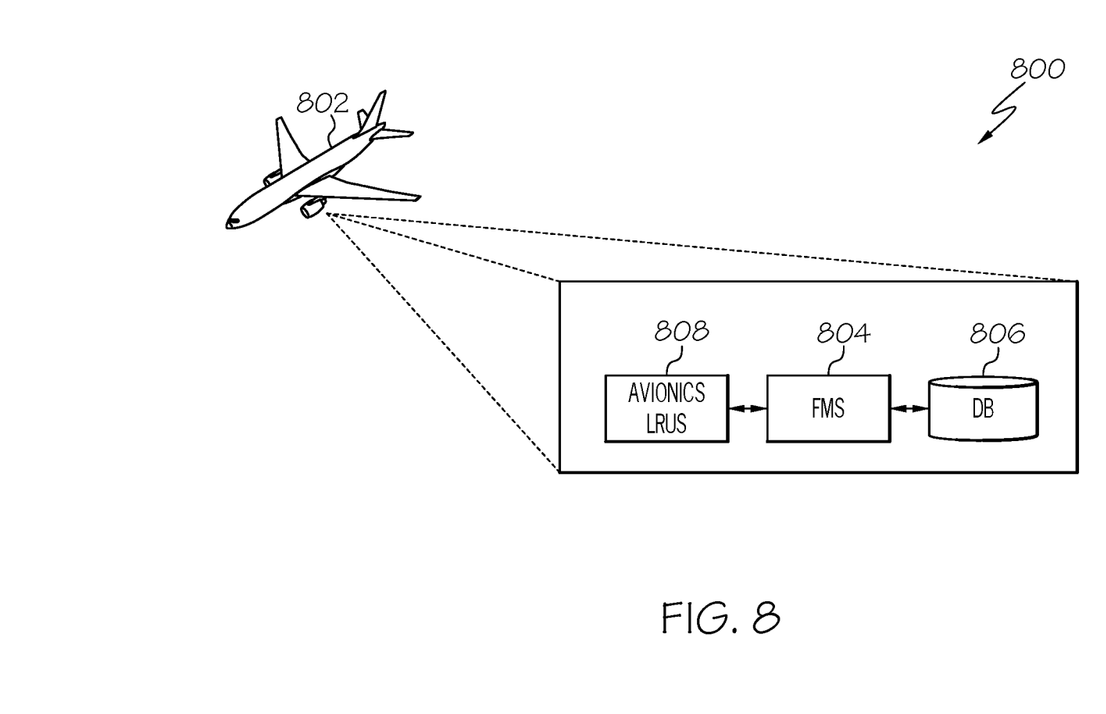
FIG. 8 shows a diagram of an aircraft with an onboard flight management system (FMS) and associated database (DB) in accordance with one embodiment.

Turning now to FIG. 8, a diagram 800 is shown of an in-flight aircraft 802 that contains an onboard FMS 804 along with a database 806 and avionics line-replaceable units (LRUs) 808 that are accessed by the FMS 804 in accordance with one embodiment. In alternative embodiments, the database 806 may be integrated as part of the FMS 804. In still other embodiments, the database 806 may be located off board the aircraft on the ground and connected to the FMS 804 via a communications data link. In some embodiments, the database 806 may include a navigation database as well as performance characteristics database of the aircraft 802 for retrieval and use by the FMS 804. In present embodiments, the FMS along with a navigational database are used to store the flight plan as well as the automatic and manual reporting waypoints along the flight path.

In exemplary embodiments, an existing FMS onboard an aircraft is utilized to communicate data between existing onboard avionics systems or line-replaceable units (LRUs) which supports or otherwise performs a flight management functionality. In this regard, the FMS is configured to receive operational or status data from one or more avionics systems or LRUs onboard the aircraft at corresponding avionics interfaces and convert one or more characteristics of the operational data to support communicating the operational data with the FMS. For purposes of explanation, the subject matter may primarily be described herein in the context of converting operational data received from onboard avionics or LRUs in a first format (e.g., an avionics bus format) into another format supported by the interface with the FMS, the subject matter described herein is not necessarily limited to format conversions or digital reformatting, and may be implemented in an equivalent manner for converting between other data characteristics, such as, for example, different data rates, throughputs or bandwidths, different sampling rates, different resolutions, different data compression ratios, and the like.

The avionics LRUs generally represent the electronic components or modules installed onboard the aircraft that support navigation, flight planning, and other aircraft control functions in a conventional manner and/or provide real-time data and/or information regarding the operational status of the aircraft to the FMS. For example, practical embodiments of the aircraft system will likely include one or more of the following avionics LRUs suitably configured to support operation of the aircraft: a weather system, an air traffic management system, a radar system, a traffic avoidance system, an autopilot system, an autothrottle (or autothrust) system, a hydraulics systems, pneumatics systems, environmental systems, electrical systems, engine systems, trim systems, lighting systems, crew alerting systems, electronic checklist systems, and/or another suitable avionics system.

In exemplary embodiments, the avionics interfaces are realized as different ports, terminals, channels, connectors, or the like associated with the FMS that are connected to different avionics LRUs via different wiring, cabling, buses, or the like. In this regard, the interfaces may be configured to support different communications protocols or different data formats corresponding to the respective type of avionics LRU that is connected to a particular interface. For example, the FMS may communicate navigation data from a navigation system via a navigation interface coupled to a data bus supporting the ARINC 629 (or A629) standard, or other suitable avionics databus standards. As another example, a datalink system or other communications LRU may utilize an ARINC 619 (or A619) compatible avionics bus interface for communicating datalink communications or other communications data with the FMS.

An FMS is a specialized computer that automates a variety of in-flight tasks such as in-flight management of the flight plan. Using various sensors such as a global positioning system (GPS), the FMS determines the aircraft's position and guides the aircraft along its flight plan using its navigation database. From the cockpit, the FMS is normally controlled through a visual display device such as a control display unit (CDU) which incorporates a small screen, a keyboard or a touchscreen. The FMS displays the flight plan and other critical flight data to the aircrew during operation.

The FMS may have a built-in electronic memory system that contains a navigational database. The navigational database contains elements used for constructing a flight plan. In some embodiments, the navigational database may be separate from the FMS and located onboard the aircraft while in other embodiments the navigational database may be located on the ground and relevant data provided to the FMS via a communications link with a ground station. The navigational database used by the FMS may typically include: waypoints/intersections; airways; radio navigation aids/ navigational beacons; airports; runway; standard instrument departure (SID) information; standard terminal arrival (STAR) information; holding patterns; and instrument approach procedures. Additionally, other waypoints may also be manually defined by pilots along the route.

The flight plan is generally determined on the ground before departure by either the pilot or a dispatcher for the owner of the aircraft. It may be manually entered into the FMS or selected from a library of common routes. In other embodiments the flight plan may be loaded via a communications data link from an airline dispatch center. During preflight planning, additional relevant aircraft performance data may be entered including information such as: gross aircraft weight; fuel weight and the center of gravity of the aircraft. The aircrew may use the FMS to modify the flight plan before takeoff or even while in flight for variety of reasons. Such changes may be entered via the CDU. Once in flight, the principal task of the FMS is to accurately monitor the aircraft's position. This may use a GPS, a VHF omnidirectional range (VOR) system, or other similar sensor in order to determine and validate the aircraft's exact position. The FMS constantly cross checks among various sensors to determine the aircraft's position with accuracy.

Additionally, the FMS may be used to perform advanced VNAV functions. The purpose of VNAV is to predict and optimize the vertical path of the aircraft. The FMS provides guidance that includes control of the pitch axis and of the throttle of the aircraft. In order to accomplish these task, the FMS has detailed flight and engine model data of the aircraft. Using this information, the FMS may build a predicted vertical descent path for the aircraft. A correct and accurate implementation of VNAV has significant advantages in fuel savings and on-time efficiency.

Figure 9:
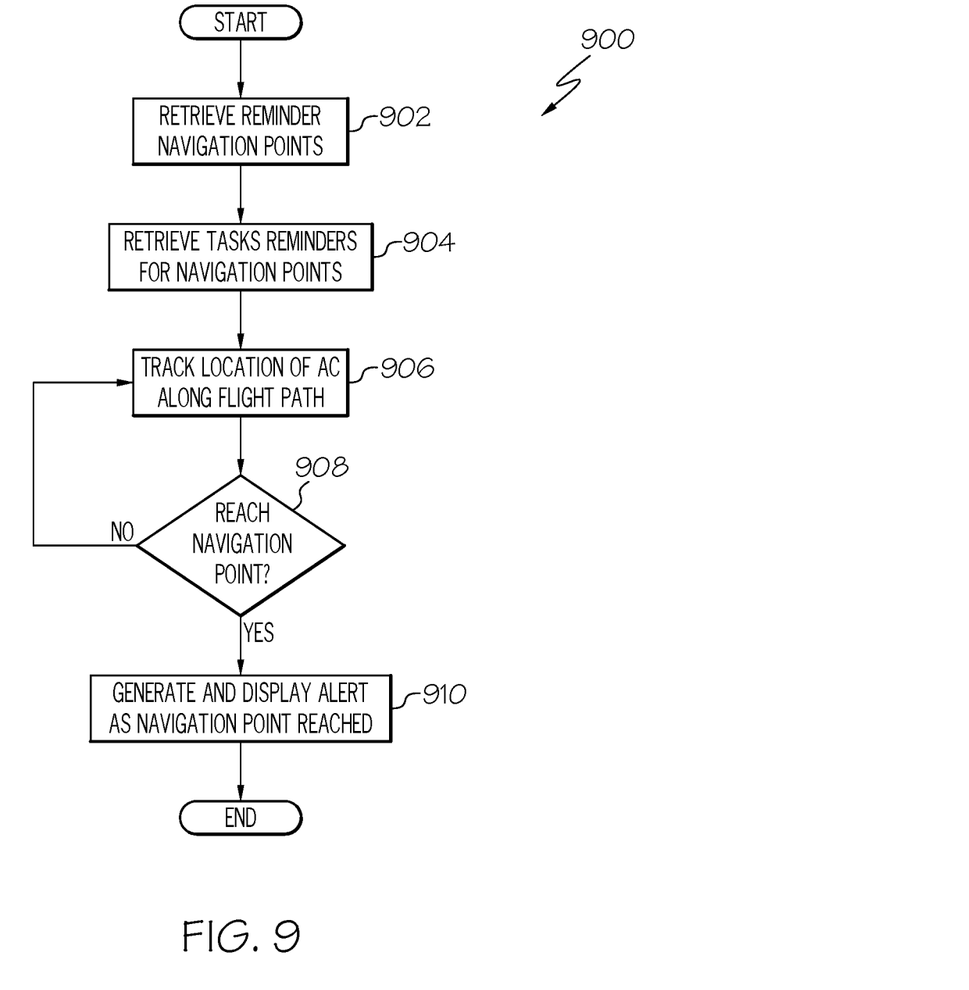
FIG. 9 shows a flowchart for a method of prompting a pilot of an aircraft of reporting task reminder in accordance with one embodiment.

Turning now to FIG. 9, a flowchart 900 is shown for a method of prompting a pilot of an aircraft with reporting task reminders. First, pre-designated reminder navigation points are retrieved from the FMS for the aircraft 902. The pre-designated reminder points may be located along of the plan flight path of the aircraft. Additionally, predefined tasks are retrieved for each pre-designated reminder navigation point stored within the FMS on board the aircraft. The location of the aircraft is tracked along the planned flight path 906 and an alert for the pilot of the aircraft is generated as the aircraft reaches each navigation point 908. The alert is generated and displayed to the pilot 910 on a visual display device located on board the aircraft. In alternative embodiments, the pre-designated reminder point may be a mandatory reporting waypoint along a flight plan stored in the FMS.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for prompting a pilot of an aircraft of reporting waypoint tasks, comprising:
   retrieving compulsory reporting waypoints from a stored flight plan for the aircraft, where the compulsory reporting waypoints are located along a planned flightpath for the aircraft;
   retrieving pre-defined waypoint tasks for each compulsory reporting waypoint, wherein the pre-defined waypoint tasks comprise a regulatory required reporting to air traffic control (ATC) that includes switching to a required radio frequency and adjusting transponder settings of the aircraft, which is to be completed by the pilot of the aircraft and wherein the pre-defined waypoint tasks are stored on a flight management system (FMS) located on board the aircraft;
   tracking a location for the aircraft along the planned flightpath;
   generating an alert for the pilot as the aircraft reaches each compulsory reporting waypoint, where the alert prompts the pilot of the pre-defined waypoint tasks for the compulsory reporting waypoints that has been reached by the aircraft; and
   displaying the alert to the pilot on a visual display device located on-board the aircraft.

2. The method of claim 1, wherein the compulsory reporting waypoints comprise a navigational aid.

3. The method of claim 1, wherein the compulsory reporting waypoints are filed as part of a flight plan.

4. The method of claim 1, wherein the predefined waypoint tasks are automatically generated.

5. The method of claim 4, wherein the waypoint tasks are automatically generated based on system requirements.

6. The method of claim 1, wherein the predefined waypoint tasks are manually generated by an aircrew member.

7. The method of claim 1, wherein the predefined waypoint tasks comprise reporting aircraft position to air traffic control (ATC).

8. The method of claim 1, wherein the predefined tasks comprise receiving an updated weather report.

9. The method of claim 1, wherein the predefined waypoint tasks comprise adjusting altimeter settings.

10. The method of claim 1, wherein the predefined waypoint tasks comprise retracting landing gear of the aircraft.

11. The method of claim 1, wherein the visual display device comprises a moving map display.

12. The method of claim 1, wherein the visual display device comprises a vertical situation display (VSD).

13. The method of claim 1, wherein the visual display device comprises a synthetic vision system (SVS).

14. The method of claim 13, wherein the SVS creates a three-dimensional display.

15. A system for prompting a pilot of an aircraft of task reminders, comprising:
   a flight management system (FMS) located on board the aircraft, where the FMS is configured to,
   retrieve pre-designated reminder navigation points for the aircraft, where the pre-designated reminder navigation points are located along a planned flightpath for the aircraft;
   retrieve task reminders for each pre-designated reminder navigation point, wherein the task reminders comprise a regulatory required reporting to air traffic control (ATC) that includes switching to a required radio frequency and adjusting transponder settings of the aircraft, which is to be completed by the pilot of the aircraft;
   track a location for the aircraft along the planned flightpath;
   generate an alert for the pilot as the aircraft reaches each pre-designated reminder navigation point, where the alert prompts the pilot of the task reminder for the pre-designated reminder navigation point that has been reached by the aircraft; and
   a visual display device located on-board the aircraft and in operable communication with the FMS, where the visual display device displays the alert to an aircrew member of the aircraft in response to commands from the FMS.

16. The system of claim 15, wherein the pre-designated reminder navigation points are mandatory reporting waypoints.

17. The system of claim 16, wherein the task reminders are pre-defined waypoint tasks.

* * * * *